Figure 1:
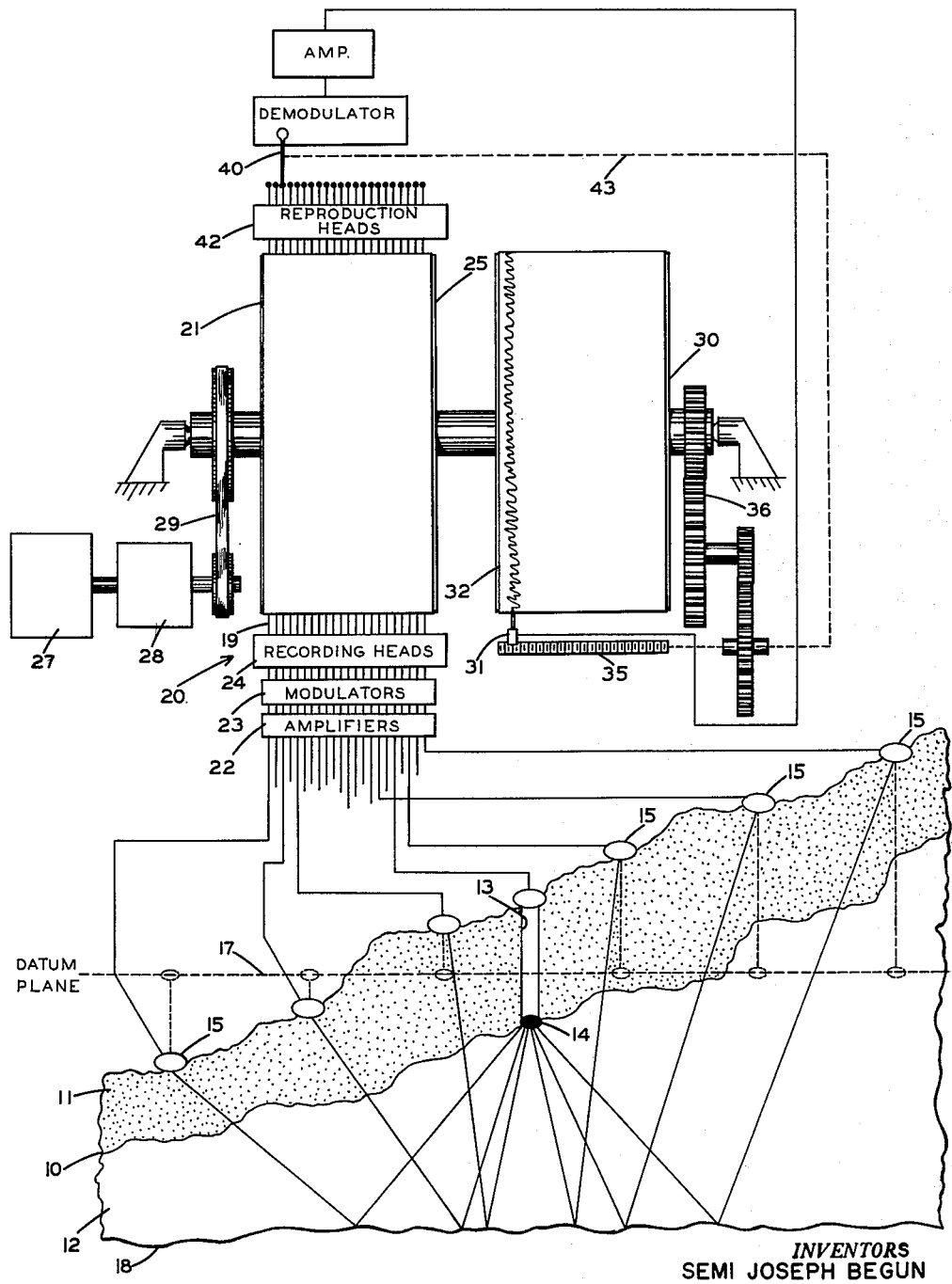

United States Patent Office 3,012,223
Patented Dec. 5, 1961

3,012,223
SEISMIC PROSPECTING APPARATUS
Semi Joseph Begun, Cleveland Heights, and Alfred P. Dank, Euclid, Ohio, assignors to Clevite Corporation, Cleveland, Ohio, a corporation of Ohio
Filed Aug. 6, 1956, Ser. No. 605,912
19 Claims. (Cl. 340—15)

This invention pertains to apparatus for seismic prospecting, and more particularly to apparatus for phase adjusting the several traces of a seismogram in accordance with given amounts of phase adjustment, and as such is a continuation-in-part of U.S. patent application S.N. 442,064, filed July 8, 1954, in the names of Semi Joseph Begun, Gim P. Chan and Alfred P. Dank, for "Multichannel Magnetic Recording," now issued as Patent No. 2,938,195, and of U.S. patent application S.N. 465,709, filed October 29, 1954, in the name of Semi Joseph Begun for "Multichannel Magnetic Reproducing Apparatus," now issued as Patent No. 2,958,849, both assigned to the same assignee. In the art of seismographic prospecting a plurality of record traces are recorded side-by-side on a record medium, each trace representing the signal output from a geophone spaced from a shot point. A plurality of the geophones are spaced varying distances away from the shot hole, and as a result of the contour of the earth the phase relationship of the side-by-side traces is not exact.

In order to bring the traces into better phase relationship an imaginary datum plane is drawn, and each of the geophones is, in effect, projected onto that datum plane. The difference in elevation between the geophone and the datum plane produces a phase correction, positive or negative depending upon whether the geophone is to one side or the other of the datum plane, which must enter into the phase correction of the side-by-side traces.

Another factor which results in out of phase adjustment of the plurality of traces is the weathered layer on the earth's surface. This layer is of varying depth and greatly influences the phase relationship of the traces on the record medium since the velocity of sound through the weathered layer is much lower than the velocity of sound through more solid portions of the earth.

When an area is to be surveyed for oil, or other deposits, the operators usually know the depth of the weathered layer either from past experience, or from core drilling. The elevation of each geophone is known, and the elevation of the imaginary datum plane is known. Consequently the phase correction for the projection of each of the geophones onto the datum plane is known, and the correction for the weathering layer is known. With these two bits of information they compute a fixed phase correction for each geophone station which is the sum of the fixed corrections for geophone elevation and for the weathered layer. A charge of dynamite is exploded, preferably at the junction between the weathered and unweathered layers, and seismic reflections are picked up by the several geophones. These reflected vibrations are converted by the geophones into electrical impulses and are recorded substantially side-by-side on a record member such as a magnetic tape, film or the like. Thereafter the several traces are reproduced, phase adjusted in accordance with the computed phase correction, and rerecorded on a second record member.

In the past this phase correction was made by hand adjustment of individual recording heads with respect to individual reproducing heads, and multichannel heads have been used for greater accuracy of alignment of the several traces. For example, see U.S. patent application S.N. 465,709, filed in the name of Semi Joseph Begun, for "Multichannel Magnetic Reproducing Apparatus," now issued as Patent No. 2,958,849.

The present invention relates to an instrument wherein the computed phase corrections for each of the several traces is set up manually, and thereafter the equipment automatically reproduces and rerecords each of the traces in sequence, and automatically phase adjusts each trace, in its entirety, with respect to each of the other traces. This method of phase adjusting the several traces is much faster and more accurate than prior art methods, especially if magnetic recording is utilized in conjunction with multichannel magnetic heads.

It is an object of the present invention to provide a device for quickly, easily and accurately adjusting the phase of each of a plurality of seismic traces with respect to each of the other traces in a seismogram.

Another object of the invention is to provide a seismic recorder wherein, after the phase adjustment has been computed and entered, the recorder automatically and in sequence phase adjusts each of the traces by a fixed amount, producing a record strip having the several traces side-by-side thereon, and in proper corrected phase relationship.

For a better understanding of the present invention, together with other and further objects thereof, reference is had to the following description taken in connection with the accompanying drawings, and its scope will be pointed out in the appended claims.

An aspect of the present invention lies in the provision of a seismic prospecting device for phase adjusting the plurality of seismic record traces with respect to each other in accordance with given, or calculated, amounts of phase adjustment. These seismic traces are initially recorded side-by-side on a first strip of record material. A second strip of record material is provided, and reproducing and recording transducer head means are electrically connected together and are associated, respectively, with the first and second record strips so that the signal reproduced from the first strip is rerecorded on the second strip. Means are provided for driving the two record strips cyclicly past the reproducing and recording transducer head means in synchronism with each other and with the length of the time period of the cycle greater than the length of the time of the original record trace. This establishes, during each cycle of the record material, a dead time period when no reproducing or rerecording of the seismic trace signal is being effected. One of the transducer head means is mounted movably with respect to the other head and for motion with respect to one of the strips of record material in the direction of the record traces. Head moving means are provided and are connected to the movably mounted transducer head means. Adjustable control means are connected to the head moving means to establish a given amount of head movement and for controlling the head moving means to bring about this given amount of head movement. This effects the given amount of phase adjustment, and synchronizing means operate in conjunction with the cyclic movements of the two strips of record material and are connected to the head moving means to cause the movable transducer head means to move only during the dead time period.

Figure 2:
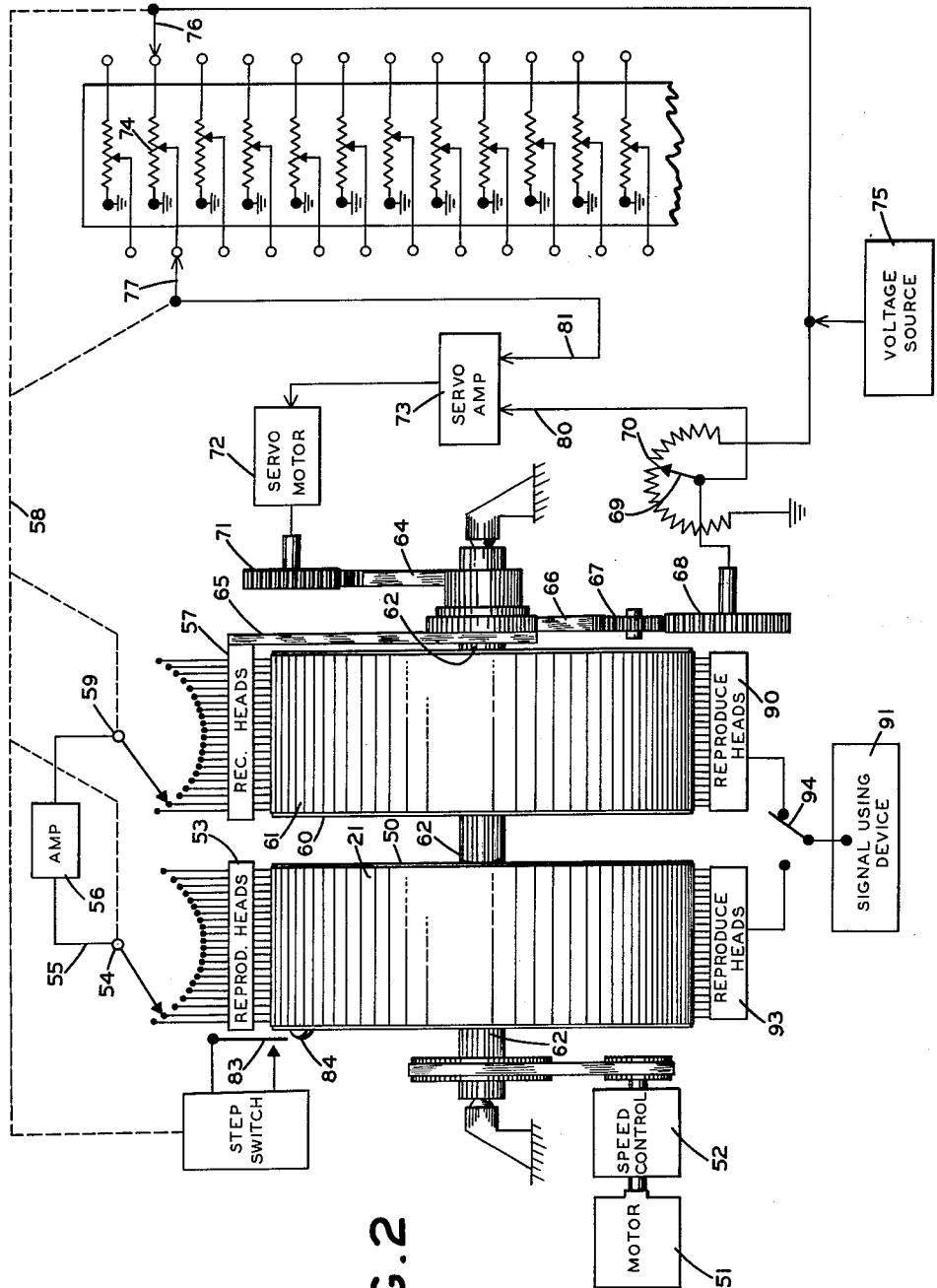

With reference to the drawings there is shown in FIGURE 1 a schematic representation of a seismic recording device and system for making a seismic record; and FIGURE 2 is a block diagram representation of the device of this invention which phase adjust the record obtained by the device shown in FIGURE 1.

FIGURE 1 shows a mechanism for obtaining a plurality of seismic record traces side-by-side on a strip of record material. This equipment, called the field unit since it is adapted for use in the field, is shown and described in more detail in U.S. patent application Serial Number 402,388, filed January 5, 1954 in the names of Semi Joseph Begun, Everett R. Sarratt, John F. Blaha and Dean R. Christian for a Recording Method and apparatus, now issued as Patent No. 2,803,515.

Its chief function is to obtain on a first strip of record material a plurality of record traces, one for each geophone, and to quickly assure that the firing of the seismic shot and the recording of the reflected seismic traces by the several geophones was successfully recorded by playing back the record as a visual trace for the operator to check.

The earth, represented by reference character 10, has a surface layer 11 of weathered, relatively loosely compacted material resting on top of the more dense, unweathered material 12. The velocity of sound waves through the weathered material is much lower than through the non-weathered material 12, due chiefly to its relatively porous nature. For example in the weathered layer 12 the velocity of sound might be about 2000'/sec., whereas in the non-weathered layer the velocity might be about 4000'/sec.

In making a record, a hole 13 is drilled down through the earth to the junction between the weathered layer 11 and the non-weathered material 12, and a charge of dynamite 14 is located there. Geophones, or seismometers, 15 are spread out across the surface 16 of the earth and each is connected to a recording head 24 of a magnetic recording device 20. Preferably the recording device has a multichannel recording head with a plurality of channels, each channel being connected to one geophone. Experience has shown that a 28 channel magnetic recorder is satisfactory, with 24 channels being connected to 24 geophones, and with the other 4 channels being used for control equipment, timing tracks, the up-hole geophone, and a time break circuit.

The geophones 15 are of course spread out in a pattern at varying distances from the shot hole 13. A simple spread is shown in FIGURE 1, wherein the geophones are equally spaced in a straight line running through the shot hole, and are on opposite sides of the shot hole. These geophones may extend over a distance of a mile or more, and are at varying elevations compared to an imaginary datum plane 17.

Acoustic vibrations from the explosion of the dynamite travel away from the shot point in all directions, and they reflect off of various subterranean layers 18, back up to the geophones 15 on the surface where they are changed to electrical impulses, then travel to the truck unit 20 where they are recorded side-by-side on a first strip of record material such as an endless magnetic belt 21. Preferably the signals are recorded as a frequency modulated signal, and accordingly an amplifier 22 and frequency modulator 23 is in each circuit between a geophone and a recording head 24.

By phase adjusting each trace on the record member 21 in accordance with its vertical distance from the datum plane 17 and in accordance with the thickness of the weathered layer 11, each geophone is, in effect, projected to the datum plane in order to make further computations less complicated.

The field equipment comprises a drum 25 onto which the magnetic record member 21 is wound, a motor 27, and speed control device 28 which, through belt 29 drives a drum 25 at a constant speed. A second drum 30 preferably is mounted on the same shaft as drum 25 so that it turns in unison therewith, and a pen recorder 31 is associated therewith to draw a trace on paper 32 wound on the surface thereof. The pen recorder 31 may be indexed across the drum 30 by a lead screw 35 driven by gears 36 connected to the shaft of drum 30, and its travel may be synchronized with the operation of switch 40 which connects successive channels of the pickup head 42 to the pen recorder 31 for a quick check on the quality of the record. The dotted line 43 indicates such a synchronization.

After the record has been made on the device illustrated in FIGURE 1 it is removed therefrom and sent to a laboratory for processing and analysis. Before the geophysicist studies the visual reproduction of the traces it is important that the several traces be phase adjusted to compensate for several fixed corrections such as the depth of the weathering layer and the height of the geophone above or below the datum plane.

The equipment shown in FIGURE 2 automatically and sequentially phase adjusts each of the plurality of seismic record traces by a calculated amount.

The first strip of record material 21 is obtained from the device shown in FIGURE 1, and it has recorded on it in side-by-side relationship the plurality of seismic record traces. The initially recorded record strip 21 is mounted on a drum 50 which is driven by motor 51 through a speed control device 52 which maintains very constant the rate of rotation of the drum 50. Reproducing transducer head means 53 are associated with the drum 50 to reproduce the plurality of record traces thereon. Preferably the system utilizes magnetic recording-reproducing techniques, and preferably the reproducing transducer head means is a multichannel magnetic head having one channel for each of the traces on the magnetizable record medium 21. However, a single reproducing head could be used with a well known step mechanism for indexing the head across the drum 50 so that the single head could reproduce each of the traces in sequence. As illustrated, the reproducing transducer head means 53 is a multichannel head having an output terminal for each of its channels, and a step switch 54 is provided for connecting the channels in sequence to an output circuit 55 which may include an amplifier 56, so that one channel at a time is reproduced into the amplifier 56. The signal is not demodulated between reproducing head 53 and recording head 57.

Recording transducer head means are electrically connected to the output of the amplifier 56, and preferably comprises a multichannel transducer head 57 having one channel for each trace to be handled, and a step switch 59 for selecting the appropriate channel, similar to the reproducing head means 53 and switch 54. The two step switches 59, 54 are actuated in unison by electrical or mechanical means 58. However, as mentioned in connection with the reproducing head means, the recording transducer head means could be a single head and means for indexing it across in synchronism with the single channel recording head. Each of the multichannel transducer heads 24, 53 and 57 should have its several transducer gaps accurately aligned.

A second drum 60 is mounted to run in synchronism with drum 50, and it carries a second strip of record material 61, preferably though not essentially, of the same material as record strip 21. A preferred way of driving the two drums 50, 60 in absolute synchronism is to mount them on the same drive shaft 62, or the two record strips could be mounted side-by-side on the same drum, or the two record strips could be two side-by-side strip portions of a single wide band of record material. Preferably the record strips are endless, for example annular tracks on a disc or drum-like member as shown, and they are cyclicly or repeatedly driven past the transducing head means 53, 57. Within the scope of the invention and the claims, however, are a system utilizing one or more endless pieces of tape rotating around two spaced pulleys; and a system utilizing one or more lengths of tape oscillating linearly back and forth past transducer head means at a constant rate of speed; the important aspects being a first and a second record strip driven cyclicly past reproducing and recording head means in synchronization with each other. The time period of the cycle must be greater than the time period of the original record trace on record member 21 to establish, during each cycle of the record member past a transducer head, a dead time period and an active time period. This relationship is achieved by making the length of the circumferential track around drum 50 longer than the seismic trace to be recorded on record member 21.

For example, if a seismic trace of 5 second duration is to be accommodated the cycle should be 6 seconds long, leaving a dead time period of 1 second. The active time period is then 5 seconds long.

One of the transducer head means 53, 57 is mounted so that it may be moved with respect to the other transducer head means and with respect to one of said record strips in the direction of the record traces. As shown in FIGURE 2 the recording transducer head means 57 are movably mounted on arm 65 which is journaled around shaft 62 for motion with respect thereto. Head mounting arm 65 is connected to the gear segment 66 which meshes with gear train 67, 68, and gear 68 is connected to the movable contact 69 of potentiometer 70. The gear segment 66 may be somewhat similar to gear segment 26, shown in FIGURE 2, of U.S. Serial No. 465,709, in the name of Semi Joseph Begun. It is rotatable with respect to shaft 62, and when it rotates it causes head means 57 to rotate around the drum 60 maintaining the head means a fixed distance from the surface thereof. The gear segment 66 is caused to rotate by its connection to a gear segment 64 which is connected through gear 71 to a servo motor 72. The servo motor is energized from the output of servo amplifier 73, one input side 80 of which is electrically connected to the arm 69 of potentiometer 70 and the other input side 81 of which is connected to any one of a plurality of adjustable potentiometers 74. There should be as many adjustable potentiometers 74 as there are seismic traces to be phase adjusted. Each of the potentiometers 74 is adjustable in accordance with a calculated amount of phase adjustment to be applied to a given seismic trace. A reference voltage source 75 is connected to the potentiometer 70, and is connected to the adjustable potentiometer 74 which is momentarily in the servo circuit. A step switch 76 and a step switch 77 are simultaneously actuated by switch actuating means 58 to connect a given potentiometer 74 to the reference voltage source 75 and to connect the potentiometer output to the servo system to properly position the head means 57 in accordance with the adjustable value calculated and set on the potentiometer 74 by the operator.

In operation the gang drive 58 of the selector switch system simultaneously indexes all switches to a position (example shown in the second contact position). The voltage from the reference through contact 76, through the adjusted potentiometer 74 to contact 77 to lead 81 to the servo amplifier 73 unbalances the amplifier if it is not the same as voltage from reference 75, through potentiometer 70, 69 to lead 80 to the amplifier 73. The unbalanced amplifier 73 energizes the servo motor 72 causing it to rotate and turn the head mounting arm 65 thus altering the recording head position with respect to reproducing head 53, and through gear chain 66, 67, 68 causing potentiometer arm 69 to establish an electrical balance which stops the movement of the servo system. Thus the position of the recording head 57 is a function of the value set on the potentiometer 74, and if different values are set on successive potentiometers the reproducing head will seek different positions as the gang switch system 58 connects different reproducing heads, recording heads and potentiometers successively into the circuit.

The selected channel of recording head 57 records on the record member 61 the signal which is being reproduced from record member 21 by reproducing head means 53, but with a positional relationship with respect to the record member which is different by the amount the recording head means 57 was moved by the servo system.

It is important that the movement of the recording head means 57 take place only during the dead time. If the head were to move while a trace was being rerecorded from record member 21 to member 61 the seismic signal would be altered. In order to cause the head means to move only during the dead time, synchronizing means are provided which operate in conjunction with the cyclic movements of the strips of record material and which are connected to the head moving means. Such a synchronizing means may be a photocell system or a microswitch device actuated by the cyclic motion of the drum 50.

As shown a switch 83 is momentarily closed once during each revolution of the drum 50 by the projection 84 on the side of the drum. Switch 83 is sold by North Electric Co., Galion, Ohio, as Model No. RVF, rotary 30 position switch, and it has sufficient capacity for 24 seismic channels and 4 timing channels. When the operation of the system is initiated switch 83 operates to automatically, and in sequence, connect the first reproducing head to the first recording head and connect the contacts 76 and 77 to the first of the potentiometers 74, during the dead time in seismic channel number 1 recorded on record member 21, and to connect the entire system to channel number 2 at the proper time. In order to obtain proper synchronization of the dead time with the switch actuating device 84 the time break, or start, of the seismic traces on the record member 21 should be indexed with respect to the device 84.

After the original record from tape 21 has been rerecorded, with phase adjustment, on tape 61 it may be reproduced by heads 90, either one channel at a time or all at once, through suitable demodulating and amplifying equipment to a signal utilizing device 91. The utilizing device 91 may include pen recorder means of camera equipment known to the art for presenting to the operator visual traces of the seismic records on tape 61.

The previously described equipment phase adjusted the several seismic traces by controlling the movements of the recording head 57. It is not essential that the recording head be moved, since movement of a reproducing head at the proper time will likewise provide the proper phase adjustment. To that end tape 61 may be the field tape having a series of previously recorded seismic traces. It may be placed on drum 60, and the head 57 serves as a movable reproducing head to phase adjust the several traces as they are reproduced, one at a time, by the proper channels of head 57, through amplifier 56 to the recording head 53 where the traces are recorded on tape 21 with proper phase adjustment. After the record has been transferred to tape 21 the traces may be reproduced by the heads 93 into the signal utilizing device 91, the switch 94 being thrown to connect heads 93 to the utilizing device 91.

A modification of the device shown in FIGURE 2 can have a seismic signal which occupies the entire circumference of the record members 21, 61, and the "dead time" during which movement of the transducer head takes place in an entire revolution of the drums. Thus, during one complete revolution of the drums the movable transducer head would be positioned, during the next revolution of the drums a seismic trace would be rerecorded, during the next revolution the head would be moved, and during the next a successive trace would be rerecorded. Stepping switch 83 would be modified so that it would advance the several switches 54, 59, 76, 77 on every second revolution of the drums and would suitably block out amplifier 56 during each revolution when the transducer head was being positioned.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In apparatus for phase adjusting a plurality of seismic record traces with respect to each other in accordance with given amounts of phase adjustment, said plurality of traces being initially recorded side-by-side on a first strip of record material with a given time period; a second strip of record material; reproducing transducer head means for reproducing said plurality of seismic record traces one at a time from said first strip of record material; recording transducer head means electrically connected to said reproducing transducer head means for rerecording the reproduced traces one at a time on said second strip of record material; means for effecting relative cyclic motion having a given time period between said first strip of record material and said reproducing head means; means for effecting relative cyclic motion between said second strip of record material and said recording head means in synchronization with the aforesaid relative cyclic motion, the time period of said cycle being greater than the time period of said original record trace to establish a dead time period when no reproducing or rerecording of the seismic trace is being effected; automatic means for effecting a second relative motion between one of said transducer head means and one of said strips of record material in the direction of said record traces; adjustable control means connected to said automatic means for establishing said amount of the second relative motion and for controlling said automatic means to automatically effect said second relative motion in accordance with said established amount; and synchronizing means operating in conjunction with the cyclic movements of the first and second strips of record material and connected to said automatic means to cause said automatic means to effect said second relative motion only during said dead time period and connected to said reproducing transducer head means and said recording head means to effect the aforesaid reproducing and rerecording of the said traces one at a time.

2. In apparatus for phase adjusting a plurality of seismic record traces with respect to each other in accordance with given amounts of phase adjustment, said plurality of traces being initially recorded side-by-side on a first strip of record material with a given time period; a second strip of record material; reproducing transducer head means for reproducing said plurality of seismic record traces one at a time from said first strip of record material; recording transducer head means electrically connected to said reproducing transducer head means for rerecording the reproduced traces one at a time on said second strip of record material; means for driving said first and second strips of record material cyclicly past said reproducing and recording transducer head means in synchronization with each other and with a given time period, the time period of said cycle being greater than the time period of said original record trace to establish a dead time period when no reproducing or rerecording of the seismic trace signal is being effected; means movably mounting one of said transducer head means with respect to said other transducer head means and for motion with respect to one of said strips of record material in the direction of said record traces; head moving means connected to said movably mounted transducer head means; adjustable control means connected to said head moving means for establishing said given amount of head movement and for controlling the said moving means to effect said given amount of head movement to produce said given amount of phase adjustment; and synchronizing means operating in conjunction with the cyclic movements of the first and second strips of record material and connected to said head moving means to cause said movable transducer head means to move only during said dead time period and connected to said reproducing transducer head means and said recording head means to effect the aforesaid reproducing and rerecording of the said traces one at a time.

3. Apparatus set forth in claim 2, further characterized by said transducer head means which is moved during said dead time being the transducer head means for rerecording the signal.

4. Apparatus as set forth in claim 2, further characterized by said transducer head means for recording and reproducing each comprising a multichannel transducer head, and by selector switch means connected to both said transducer head means for interconnecting selected channels of the reproducing head means with selected channels of the recording head means.

5. Apparatus as set forth in claim 2, further characterized by said head moving means comprising a servo mechanism, and by said adjustable control means comprising a plurality of adjustable potentiometers each having an output, one potentiometer for each said plurality of record traces, the output from each of said potentiometers controlling the positioning of said transducer head means prior to one reproducing and rerecording cycle.

6. Apparatus as set forth in claim 2, further characterized by drum means upon which said first and second strips of record material are wound.

7. Apparatus as set forth in claim 6, further characterized by said head moving means comprising a servo mechanism, and by said adjustable control means comprising a plurality of adjustable potentiometers each having an output, one potentiometer for each said plurality of record traces, the output from each of said potentiometers controlling the positioning of said transducer head means prior to one reproducing and rerecording cycle.

8. In apparatus for phase adjusting a plurality of seismic record traces with respect to each other in accordance with given amounts of phase adjustment, said plurality of seismic traces being initially recorded side-by-side on a first strip of record material with a given time period; a second strip of magnetizable record material; rotatable endless means upon which said first and second strips of record material are mounted; reproducing transducer head means for reproducing said plurality of record traces one at a time from said first strip of record material; recording transducer head means electrically connected to said reproducing transducer head means for rerecording the reproduced traces one at a time on said second strip of record material; means for driving said rotatable endless means to drive said first and second strips of record material cyclicly past said reproducing and recording transducer head means in synchronism with each other and with a given time period, the time period of said cycle being greater than the time period of said original seismic record trace to establish a dead time period when no reproducing or rerecording of the seismic record trace is being effected; means movably mounting one of said transducer head means with respect to said other transducer head means and for motion with respect to one of said strips of record material in the direction of said record traces; head moving means connected to said movably mounted transducer head means; and adjustable potentiometer servo means connected to said head moving means and including adjustable potentiometer means for establishing a given amount of head movement for each of said seismic traces, and a servo mechanism connected to said potentiometer means for controlling the head moving means to produce said given amount of phase adjustment; and synchronizing means operating in conjunction with the cyclic rotation of said endless rotatable means to cause said movable transducer head means to move only during said dead time period and connected to said reproducing transducer head means and said recording head means to effect the aforesaid reproducing and rerecording of the said traces one at a time.

9. Apparatus as set forth in claim 8, further characterized by said reproducing and recording head means each comprising a plurality of head means, and selector switch means for interconnecting the proper channels of said two transducer head means and for selecting the proper adjustable potentiometer and for conecting it to said servo mechanism.

10. In apparatus for phase adjusting a plurality of seismic record traces with respect to each other in accordance with given amounts of phase adjustment, said plurality of traces being initially recorded side-by-side on a first strip of magnetizable record material with a given time period; a second strip of magnetizable record material; magnetic reproducing transducer head means for reproducing said plurality of record traces one at a time from said first strip of magnetizable record material; magnetic recording transducer head means electrically connected to said magnetic reproducing transducer head means for rerecording the reproduced traces one at a time on said second strip of magnetic record material; means for driving said first and second strips of record material cyclicly past said reproducing and recording transducer head means in synchronization with each other and with a given time period, the time period of said cycle being greater than the time period of said original record trace to establish a dead time period when no reproducing or rerecording of the record trace signal is being effected; means movably mounting one of said transducer head means with respect to said other transducer head means for motion with respect to one of said strips of record material in the direction of said record traces; head moving means connected to said movably mounted transducer head means; and adjustable control means connected to said head moving means for establishing said given amount of head movement and for controlling the head moving means to effect said given amount of head movement to produce said given amount of phase adjustment; and synchronizing means operating in conjunction with the cyclic movements of said first and second strips of record material to cause said movable transducer head means to move only during said dead time period and connected to said reproducing transducer head means and said recording head means to effect the aforesaid reproducing and rerecording of the said traces one at a time.

11. Apparatus as set forth in claim 10, further characterized by said reproducing and recording transducer head means each comprising a multichannel magnetic transducer head whose transducer gaps are accurately aligned in a plane.

12. Apparatus as set forth in claim 11, further characterized by selector switch means for interconnecting selected channels of the reproducing head means with selected channels of the recording head means.

13. Apparatus as set forth in claim 12, further characterized by said head moving means comprising a servo mechanism, and by said adjustable control means comprising a plurality of adjustable potentiometers each having an output, one potentiometer for each said plurality of record traces, the output from each of said potentiometers controlling the positioning of said transducer head means prior to one reproducing and rerecording cycle.

14. Apparatus as set forth in claim 13, further characterized by selector switch means connected to said servo mechanism for selectively connecting a given potentiometer to said servo mechanism, and common means actuating said selector switch means for said transducer head means and actuating said selector switch means for said servo mechanism.

15. Apparatus as set forth in claim 14, further characterized by drum means upon which said first and second strips of record material are wound, and said means for driving said strips driving said drum means.

16. In apparatus for phase adjusting a plurality of record traces with respect to each other in accordance with given amounts of phase adjustment, said plurality of traces being initially recorded side-by-side on a first endless strip of record material, each said trace occupying only a recorded portion of a circular track on said endless strip and leaving an unrecorded portion thereof; a second endless strip of record material; means driving said first and second strips of record material at the same speed for repeated rotation; reproducing transducer head means associated with said first endless strip of record material for reproducing in sequence the plurality of traces recorded thereon as said first strip of record material repeatedly passes said transducer head means; recording transducer head means electrically connected to said reproducing transducer head means and associated with said second strip of record material for rerecording thereon the traces reproduced from said first record strip; means rotatably mounting one of said transducer head means for motion in the direction of said recorded traces with respect to said other transducer head means; and correlating means engaging said movably mounted transducer head means and operating in timed sequence synchronized with the rate of rotation of said strips of record material for moving said transducer head means as said unrecorded portion of a circular track passes said reproducing head means and synchronizing means operating in conjunction with the rotation of said first and second strips of record material and connected to said reproducing and recording head means and connected to said correlating means to effect the rerecording of the phase corrected traces in sequence.

17. In apparatus for phase adjusting a plurality of record traces with respect to each other in accordance with given amounts of phase adjustment, said plurality of traces being initially recorded side-by-side on a portion only of a first endless strip of magnetizable record material as a frequency modulated carrier signal leaving an unrecorded portion; a second endless strip of magnetizable record material; means cyclicly driving said first and second strips of record material at the same speed; reproducing transducer head means associated with said first endless strip of record material for reproducing in sequence the plurality of traces recorded thereon as said first strip of record material repeatedly passes said transducer head means; recording transducer head means electrically connected to said reproducing transducer head means and associated with said second strip of record material for recording thereon as a frequency modulated signal the signals reproduced by the reproducing head means and leaving on said second strip an unrecorded portion; means rotatably mounting one of said transducer head means for motion in the direction of said recorded traces and with respect to said other transducer head means; and correlating means engaging said movably mounted transducer head means and operating in timed sequence synchronized with the rate of rotation of said strips of record material for moving said transducer head means as the unrecorded portion of the record track passes said reproducing head means and synchronizing means operating in conjunction with the rotation of said first and second strips of record material and connected to said reproducing and recording head means and connected to said correlating means to effect the rerecording of the phase corrected traces in sequence.

18. In apparatus for phase adjusting a plurality of seismic record traces with respect to each other in accordance with given amounts of phase adjustment, said plurality of traces being initially recorded side-by-side on a first strip of record material; a second strip of record material; reproducing transducer head means for reproducing said plurality of seismic record traces one at a time from said first strip of record material; recording transducer head means electrically connected to said reproducing transducer head means for rerecording the reproduced traces one at a time on said second strip of record material; means for effecting relative cyclic motion between said first strip of record material and said reproducing head means; means for effecting relative cyclic motion between said second strip of record material and said recording head means in synchronization with the aforesaid relative cyclic motion, the periods of the aforesaid two cyclic motions being equal, each said period being divided into a dead time period when no reproducing or rerecording of the seismic trace is being effected and an active time period when seismic traces are being transduced; automatic means for effecting a second relative motion between one of said transducer head means and one of said strips of record material in the direction of said record traces; adjustable control means connected to said automatic means for establishing said amount of the second relative motion and for controlling said automatic means to automatically effect said second relative motion in accordance with said established amount; and synchronizing means operating in conjunction with the cyclic movements of the first and second strips of record material and connected to said automatic means to cause said automatic means to effect said second relative motion only during a dead time period and connected to said reproducing transducer head means and said recording head means to effect the aforesaid reproducing and rerecording of the said traces one at a time.

19. Apparatus as set forth in claim 18 further characterized by each of said dead time periods comprising a portion of the line for one cycle of said record material.

References Cited in the file of this patent

UNITED STATES PATENTS

| | | |
|---|---|---|
| 2,628,689 | Rieber | Feb. 17, 1953 |
| 2,658,579 | Rieber | Nov. 10, 1953 |
| 2,671,375 | Boucher | Mar. 9, 1954 |
| 2,732,025 | Lee | Jan. 24, 1956 |
| 2,800,639 | Lee | July 23, 1957 |
| 2,803,515 | Begun | Aug. 20, 1957 |
| 2,806,757 | Cunningham | Sept. 17, 1957 |
| 2,837,729 | Houghton | June 3, 1958 |
| 2,876,428 | Skelton | Mar. 3, 1959 |

UNITED STATES PATENT OFFICE
CERTIFICATION OF CORRECTION

Patent No. 3,012,223  December 5, 1961

Semi Joseph Begun et al.

It is hereby certified that error appears in the above numbered patent requiring correction and that the said Letters Patent should read as corrected below.

Column 12, line 6, for "line" read -- time --.

Signed and sealed this 24th day of April 1962.

(SEAL)
Attest:

ESTON G. JOHNSON
Attesting Officer

DAVID L. LADD
Commissioner of Patents